United States Patent [19]
Kuklo

[11] Patent Number: 5,199,040
[45] Date of Patent: Mar. 30, 1993

[54] MONOLITHIC DYE LASER AMPLIFIER

[75] Inventor: Thomas C. Kuklo, Ripon, Calif.

[73] Assignee: The United States of America as represented by the United States Department of Energy, Washington, D.C.

[21] Appl. No.: 707,510

[22] Filed: May 30, 1991

[51] Int. Cl.⁵ ............................................... H01S 3/02
[52] U.S. Cl. ........................................ 372/54; 356/246
[58] Field of Search ...................... 372/54, 53; 356/246

[56] References Cited

U.S. PATENT DOCUMENTS 3,931,594 1/1976 Schäfer .................................. 372/72
4,296,388 10/1981 Draggoo .............................. 372/53

Primary Examiner—James W. Davie
Attorney, Agent, or Firm—Miguel A. Valdes; Roger S. Gaither; William R. Moser

[57] ABSTRACT

A fluid dye laser amplifier for amplifying a dye beam by pump beams has a channel structure defining a channel through which a laseable fluid flows and the dye and pump beams pass transversely to one another through a lasing region. The channel structure is formed with two pairs of mutually spaced-apart and mutually confronting glass windows, which are interlocked and make surface-contacts with one another and surround the lasing region. One of the glass window pairs passes the dye beam and the other passes the pump beams therethrough and through the lasing region. Where these glass window pieces make surface-contacts, glue is used to join the pieces together to form a monolithic structure so as to prevent the dye in the fluid passing through the channel from entering the space between the mutually contacting glass window pieces.

5 Claims, 3 Drawing Sheets

MONOLITHIC DYE LASER AMPLIFIER

The United States Government has rights to this invention pursuant to Contract No. H-7405-ENG-48 between the United States Department of Energy and the University of California for the operation of the Lawrence Livermore National Laboratory.

BACKGROUND OF THE INVENTION

This invention relates to an improved dye laser amplifier and more particularly to a liquid flow channel structure for a dye laser amplifier which is monolithically formed for improved performance.

Liquid dye lasers are commonly used for laser oscillation or amplification in many applications requiring high energy in each laser pulse, high repetition rate and an output beam of laser radiation of high optical quality and low divergence. For satisfying such requirements, it has been known to provide a transverse pump laser system wherein the optical axis of an optical system is transverse to the flow direction of a laseable fluid material such as a dye solution so as to permit a rapid replenishment of a dye material into the lasing region to replace expended dye and to thereby increase both power and repetition rate.

U.S. Pat. No. 4,296,388 issued Oct. 20, 1981 to V. G. Draggoo disclosed a fluid dye laser amplifier of this type with two pairs of glass pieces fused together to surround a lasing region by forming two mutually opposite windows for passing a pumping laser beam and two mutually opposite windows for passing a signal beam to be amplified perpendicularly to the direction of passage of the pumping laser beam. With a fluid passage of a fluid dye laser amplifier thus formed, however, damaged glass pieces cannot be replaced.

More recently, a fluid dye laser amplifier was formed by assembling four glass pieces to form a channel as a fluid passage in the middle (U.S. patent application Ser. No. 6/911,271 filed Sept. 22, 1986, and now abandoned, and continued to U.S. patent application Ser. No. 07/268,454 filed Oct. 28, 1988 and commonly assigned). O-rings were provided where these glass pieces contacted each other but the hydraulic pressure of the dye solution accelerating through the channel increases to a significant degree when the liquid passes through the lasing region. This increased pressure forces a part of the dye to enter the space between mutually adjacent pairs of these glass pieces and to thereby cause undesirable optical disturbance.

SUMMARY OF THE INVENTION

It is therefore a general object of the present invention to provide a dye laser amplifier with improved performance.

It is a more specific object of the invention to provide a channel structure for a dye laser amplifier without optical disturbance.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the dye laser amplifier of this invention may comprise a channel structure with four glass pieces which are assembled and joined together completely by a glue compatible with the solvent used for the dye so as to form together a monolithic structure.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

In these figures, corresponding components are designated by like reference numerals.

DETAILED DESCRIPTION OF THE INVENTION

In what follows, the present invention will be described by way of an example and with reference simultaneously to FIGS. 1, 2, 3, 4, 5, 6, 7, 8 and 9 but this intended to be merely illustrative, and not limitative FIGS. 1, 2, 3, 4, 5, 6, 7, 8 and 9 illustrate a channel structure 10 according to the present invention which forms a part of an overall dye laser amplifier (not shown). The dye laser amplifier itself is one in which a continuously replenished supply of dye dissolved in a liquid medium is excited (pumped) with one or more excitation or pumping beams, such as pulsed copper vapor laser (CVL) beams, in order to amplify the intensity of another beam (hereinafter referred to as the dye beam) and to thereby output an amplified beam. Since these beams and the dye do not by themselves form a part of the present invention, they will not be described in detail herein. It is to be understood, however, that the pumping beams, the dye beam and the dye are selected appropriately so as to cooperate with one another to amplify the dye beam in a known and desired way. Moreover, the channel structure 10 of FIGS. 1, 2, 4, 5, 6, 7, 8 and 9 is to be understood as forming only a part of a longer passage for a liquid dye, but the upstream and downstream portions of the liquid dye passage which connect to the illustrated channel structure 10 are not a part of the present invention and hence are not described or illustrated.

Figure 2:
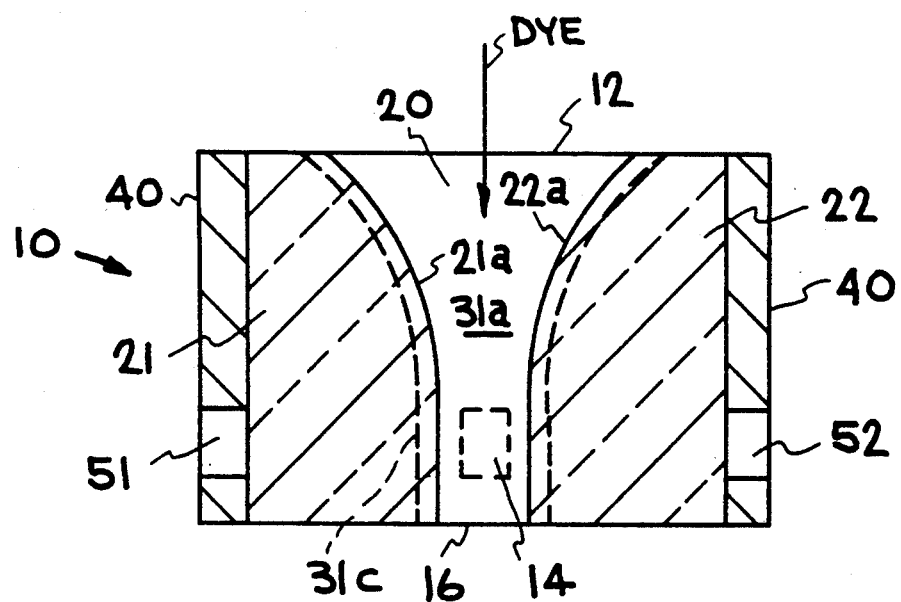
FIG. 2 is a schematic sectional view of the structure of FIG. 1 taken along the line 2—2 of FIG. 1.
Figure 3:
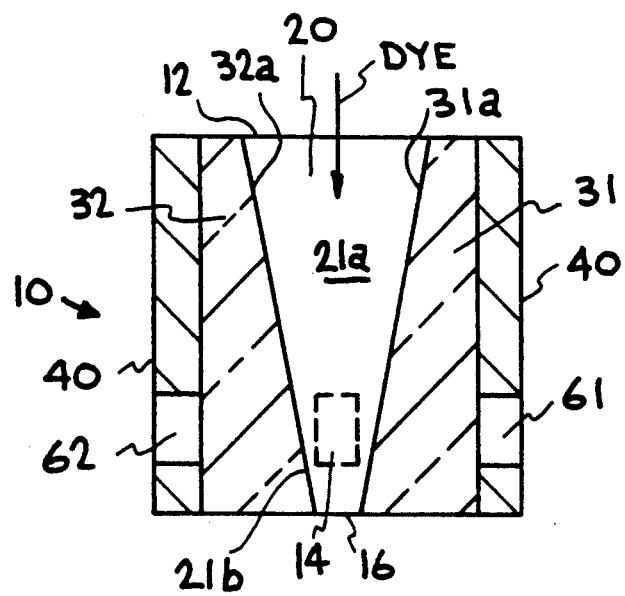
FIG. 3 is a schematic sectional view of the structure of FIGS. 1 and 2 taken along the line 3—3 of FIG. 1.
Figure 4:
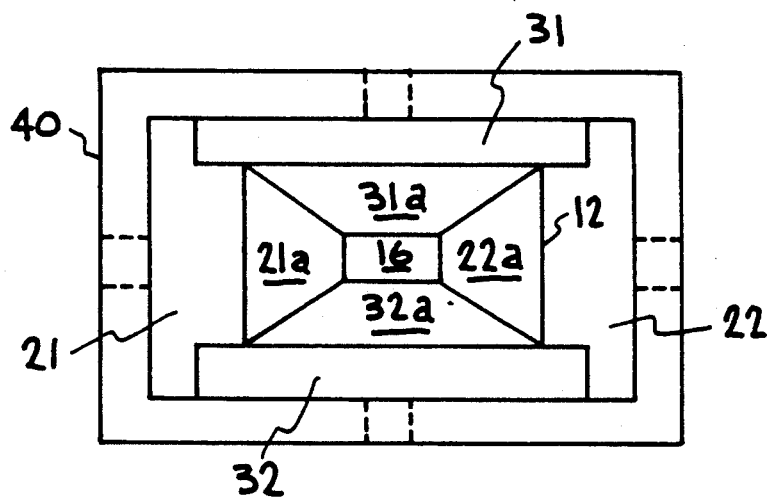
FIG. 4 is a top view of the structure of FIGS. 1-3.
Figure 5:
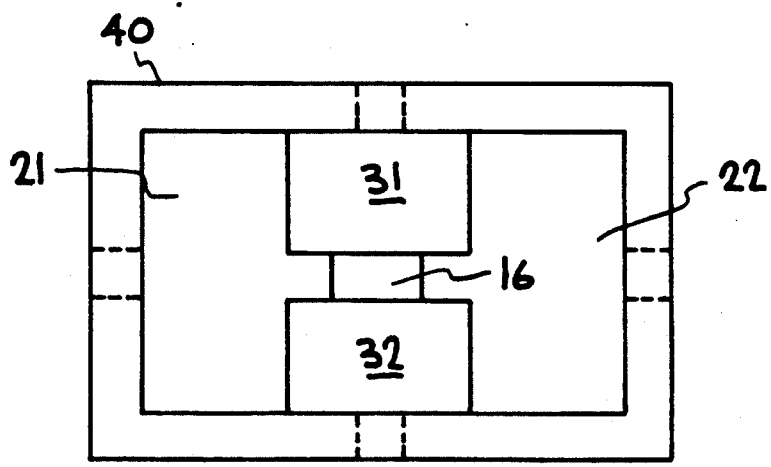
FIG. 5 is a bottom view of the structure of FIGS. 1-3.
Figure 7:
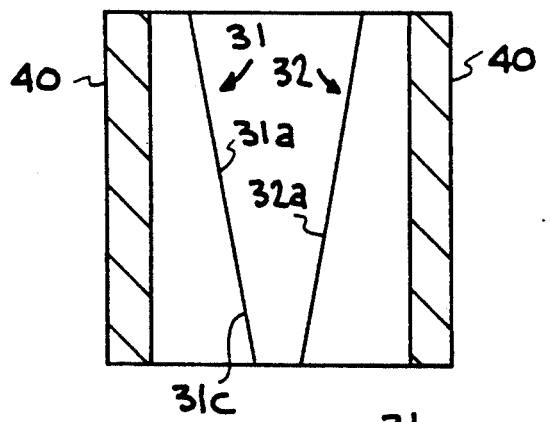
FIG. 7 is a sectional view, taken on line 7—7 of FIG. 1, with both pump beam windows removed to show side views of the dye beam windows.
Figure 6:
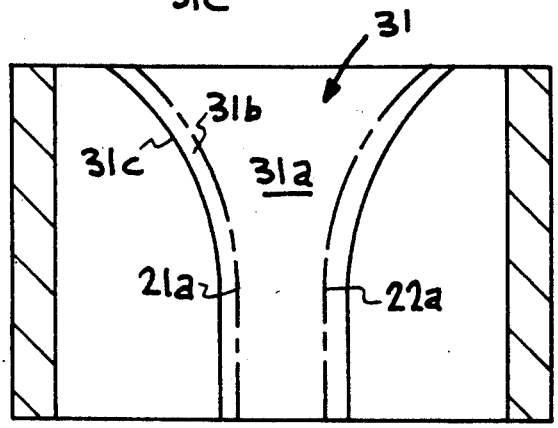
FIG. 6 is a sectional view, similar to FIG. 2 and taken on line 2—2 of FIG. 1, but with both pump beam windows removed to show the shape of one of the dye beam windows.
Figure 8:
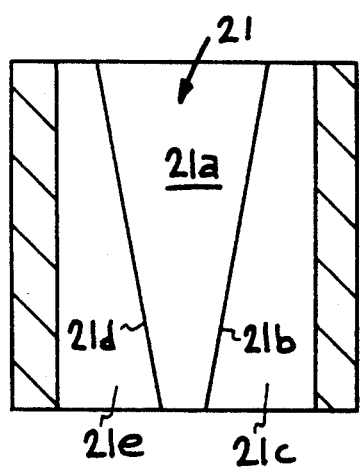
FIG. 8 is a sectional view, similar to FIG. 3 and taken on line 3—3 of FIG. 1, but with the dye beam windows removed to show the shape of one of the pump beam windows.
Figure 9:
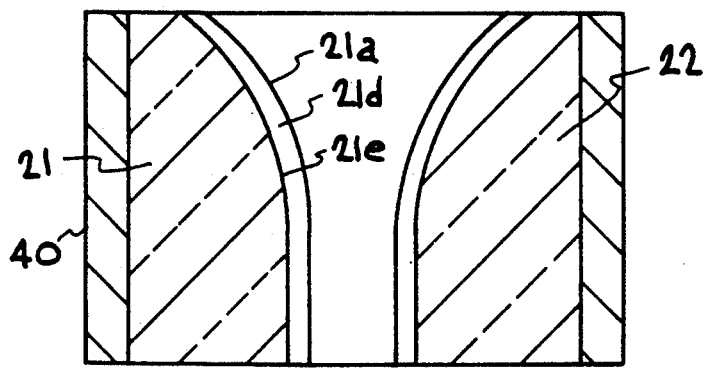
FIG. 9 is a sectional view, taken on line 9—9 of FIG. 1, with both dye beam windows removed to show side sectional views of the pump beam windows.

For purposes of description, FIGS. 2 and 3 are considered as vertical sectional views of the channel structure 10 such that a continuous stream of dye is received thereby through an inlet 12 at the top as indicated by arrows marked "DYE" and passes downward through what is herein referred to as a lasing region 14 toward an outlet 16 at the bottom. The lasing region 14 is the region inside the passage of the liquid dye where, as explained above in general, a dye beam is to be amplified, or optically pumped, by a pump beam.

The passage for the liquid dye downward through the channel structure 10 is formed essentially with two pairs of mutually confronting glass windows 21, 22, 31 and 32 enclosed inside a box-like metallic shell 40. The mutually confronting pair of glass windows 21 and 22 is hereinafter referred to as pump beam windows and the other mutually confronting pair 31 and 32 as dye beam windows. The shell 40 may be made of stainless steel and each of its four side walls is provided with an opening for a laser beam to pass through. The two openings through the mutually opposite side walls of the shell 40, opening respectively to the two pump beam windows 21 and 22, are hereinafter referred to as pump beam openings 51 and 52 and the two openings through the other pair of mutually opposite side walls of the shell 40 and adjacent respectively to the two dye beam windows 31 and 32 are referred to as dye beam openings 61 and 62. These openings 51, 52, 61 and 62 are so positioned with respect to one another as well as with respect to the four glass windows 21, 22, 31 and 32 that pumping beams such as copper vapor laser beams can be injected into the channel structure 10 respectively through the pump beam openings 51 and 52 and through the two pump beam windows 21 and 22 to reach the lasing region 14, and further that a beam to be amplified (referred to above as a dye beam) can be injected perpendicularly to the directions of injection of the pump beams into the channel structure 10 through one of the dye beam windows (may also be referred to as the input opening) 61 and through one of the dye beam windows 21 to reach the lasing region 14 and, after it is amplified there by pump beams, pass straightly through the other dye beam window 22 and the other dye beam opening (may also be referred to as the output opening) 62 as an amplified beam.

Figure 1:
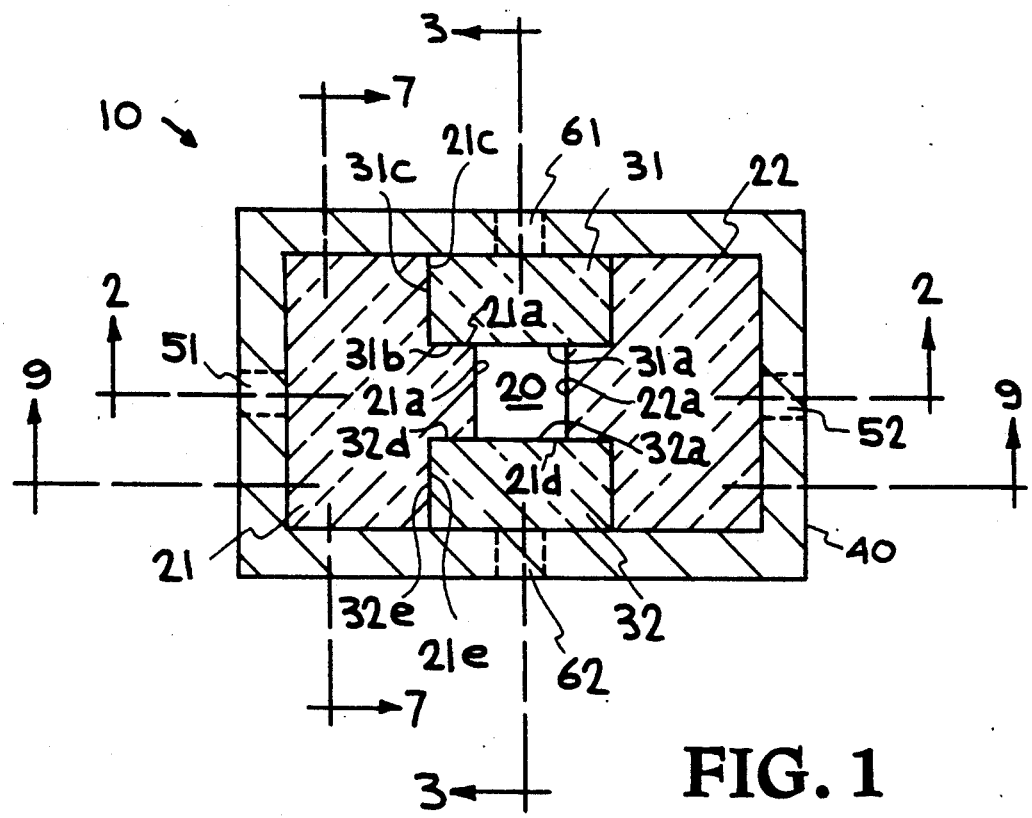
FIG. 1 is a schematic sectional view of a channel structure of a fluid dye laser amplifier embodying the present invention.

As shown in FIGS. 1, 2, 3, 4, 5, 6, 7, 8 and 9, the four glass pieces serving as windows 21, 22, 31 and 32 are assembled together such that each of the dye beam windows 31 and 32 is in surface-contact with and sandwiched between the two pump beam windows 21 and 22. Neither the pair of dye windows 31 and 32 nor the pair of pump beam windows 21 and 22 touches each other such that the vertical passage 20 for liquid dye is formed in the middle. The inwardly facing surfaces 21a, 22a, 31a and 32a of the four windows 21, 22, 31 and 32 define the boundary of this passage 20 and are so configured that the speed of flow of the liquid dye passing downward through the passage will increase from the inlet 12 to the lasing region 14. In other words, these inwardly facing surfaces 21a, 22a, 31a and 32a are curved and/or inclined such that the horizontal cross-sectional area of the passage 20 decreases gradually from the position of the inlet 12 to the lasing region 14. As discussed above, it is important for the purpose of the amplifier that the stream of dye flowing through the channel structure 10, and in particular through the lasing region 14, be optically homogeneous and free of turbulence. Thus, these inwardly facing surfaces 21a, 22a, 31a, and 32a of the four glass windows 21, 22, 31 and 32 are polished to a microsmooth finish.

Where the windows 21, 22, 31 and 32 make surface-contacts with each other, e.g. where the extension 31b of surface 31a of window 31 abuts the shoulder 21b of window 21, where the edge 31c of window 31 abuts the surface 21c of window 21, where the extension 32d of surface 32a of window 32 abuts the shoulder 21d of window 21, where the edge 32e of window 32 abuts the surface 21e of window 21. glue (such as an epoxy glue) is applied to the contact surface such that the four windows 21, 22, 31 and 32 are not merely interlocked and assembled in contact with each other as shown in FIG. 1 but also joined together to form a single monolithic structure such that the dye, which may be dissolved and stream down through the passage 20 in the middle thereof at a high flow speed, will not enter any space between the windows 21, 22, 31 and 32. The glue is therefore selected so as to be compatible with any solvents which may be expected to be used to dissolve the dye for use with the amplifier.

The foregoing description of a preferred embodiment of the invention has been presented for purposes of illustration and description. It is not intended to be exhaustive or to limit the invention to the precise form disclosed, and obviously many modifications and variations are possible in light of the above teaching. In particular, the drawings by way of which the invention has been described are intended to be schematic and are not intended to precisely describe the shapes of the glass windows. Regarding the curves and slopes of their inwardly facing surfaces, many studies have been done and their results have been published for obtaining a desired pattern of flow. The surface shapes of these glass windows are not a part of the present invention and hence have been illustrated only schematically. As for components which are expected to cooperate with a channel structure of the present invention to form a dye laser amplifier, they have also been described elsewhere. Neither do they form a part of the invention and hence have been described. No particular kind of glue was mentioned but persons skilled in relevant arts are expected to know, when informed of the kind of solvent to be used with the dye, what glues are compatible with such solvent. Other than that, no particular choice of glue is intended to limit the invention. The pump beams and the dye beam need not necessarily be injected perpendicularly to each other. They are merely intended to be transverse to each other. The embodiment was chosen and described in order to best explain the principles of the invention and its practical application to thereby enable others skilled in the art to best utilize the invention in various embodiments and with various modifications as are suited to the particular use contemplated.

What is claimed is:

1. A channel structure for a fluid dye laser amplifier and having a flow passage therethrough with an inlet and an outlet for flow of a laseable fluid therethrough, said flow passage having a lasing region between said inlet and outlet, said channel structure having a pumping beam axis transverse to the flow passage at said lasing region and a signal beam axis transverse to both said flow passage at said lasing region and said pump beam axis, said channel structure comprising:

a pair of opposed and spaced-apart first glass window pieces disposed on opposite sides of said lasing region and positioned for transmission therethrough of a beam projected along said pumping beam axis;

a pair of opposed and spaced-apart second window pieces disposed on opposite sides of said lasing region for transmission therethrough of a beam projected along said signal beam axis;

said pairs of first and second window pieces having opposed and inwardly facing surfaces contiguous to each other and forming said flow passage and being shaped so that the cross-sectional area of said flow passage decreases gradually from said inlet end of said passage to said lasing region therein;

each of said first window pieces having surfaces in abutment with surfaces of both of said second window pieces, said abutting surfaces being joined by a glue such that said pairs of first and second window pieces form a monolithic structure with said flow passage passing therethrough.

2. The channel structure of claim 1, wherein said laseable fluid contains a dye and a solvent, and wherein said glue is an epoxy glue compatible with said solvent.

3. The channel structure of claim 1 and further including a metallic shell surrounding said pairs of first and second window pieces.

4. The channel structure of claim 3 wherein said metallic shell comprises stainless steel.

5. The channel structure of claim 3, wherein said metallic shell has openings on said pumping beam axis and said signal beam axis.

* * * * *